(12) United States Patent
Lazovic et al.

(10) Patent No.: US 10,534,773 B2
(45) Date of Patent: Jan. 14, 2020

(54) INTELLIGENT QUERY PARAMETERIZATION OF DATABASE WORKLOADS

(71) Applicant: Microsoft Technology Licensing, LLC, Redmond, WA (US)

(72) Inventors: Iva Lazovic, Belgrade (RS); Dejan Krakovic, Belgrade (RS); Vladimir Milosevic, Belgrade (RS); Andrija Jovanovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 15/474,931

(22) Filed: Mar. 30, 2017

(65) Prior Publication Data
US 2018/0285417 A1  Oct. 4, 2018

(51) Int. Cl.
*G06F 16/00* (2019.01)
*G06F 16/2453* (2019.01)

(52) U.S. Cl.
CPC .............. *G06F 16/24542* (2019.01)

(58) Field of Classification Search
CPC ................................ G06F 16/24542
USPC ......................................... 707/718
See application file for complete search history.

(56) References Cited

U.S. PATENT DOCUMENTS

| 7,958,113 | B2 * | 6/2011 | Fan ................ G06F 16/24545 707/718 |
| 8,032,522 | B2 | 10/2011 | Goldstein et al. |
| 8,224,806 | B2 * | 7/2012 | Al-Omari ......... G06F 16/24524 707/713 |
| 8,386,467 | B2 * | 2/2013 | Burger ............. G06F 16/24542 707/713 |

(Continued)

FOREIGN PATENT DOCUMENTS

WO   2010077362 A2   7/2010

OTHER PUBLICATIONS

Stein, et al., "SQL Database Advisor", https://docs.microsoft.com/en-us/azure/sql-database/sql-database-advisor, Published on: Sep. 30, 2016, 5 pages.

(Continued)

*Primary Examiner* — Hanh B Thai
(74) *Attorney, Agent, or Firm* — Workman Nydegger

(57) ABSTRACT

Beneficial query parameterization of one or more databases may be automatically determined. Data associated with a workload of the one or more databases may be automatically gathered and accessed. The gathered data may then be automatically analyzed to determine whether query parameterization would be beneficial to the one or more databases. Based on the analysis one or more query parameterization recommendations may be generated for presentation to a user of the one or more databases. A user response associated with implementing at least one of the one or more query parameterization recommendations may then be received.

(Continued)

Upon implementing at least one of the one or more recommendations, the at least one implemented recommendation may be automatically verified whether an expected improvement of the one or more databases has been realized. When the expected improvement has not been realized, the one or more databases may be reverted to a previous state.

20 Claims, 5 Drawing Sheets

(56) References Cited

U.S. PATENT DOCUMENTS

| | | | | |
|---|---|---|---|---|
| 8,473,484 | B2* | 6/2013 | Egan | G06F 16/284 |
| | | | | 707/718 |
| 8,745,036 | B2* | 6/2014 | Burger | G06F 16/24542 |
| | | | | 707/718 |
| 8,775,413 | B2* | 7/2014 | Brown | G06F 16/24542 |
| | | | | 707/718 |
| 8,856,103 | B2* | 10/2014 | Barber | G06F 16/221 |
| | | | | 707/718 |
| 8,996,504 | B2* | 3/2015 | Aluc | G06F 16/24542 |
| | | | | 707/718 |
| 9,519,687 | B2* | 12/2016 | Dickie | G06F 16/24578 |
| 10,055,470 | B1* | 8/2018 | Manzo | G06F 16/256 |
| 10,229,359 | B2* | 3/2019 | Finlay | G06F 16/24542 |
| 2006/0085375 | A1* | 4/2006 | Egan | G06F 16/24542 |
| 2006/0143162 | A1 | 6/2006 | Bernacki et al. | |
| 2007/0276825 | A1 | 11/2007 | Dettinger et al. | |
| 2008/0065616 | A1 | 3/2008 | Brown | |
| 2010/0198810 | A1* | 8/2010 | Graefe | G06F 16/24542 |
| | | | | 707/718 |
| 2010/0198811 | A1* | 8/2010 | Wiener | G06F 16/24549 |
| | | | | 707/718 |
| 2011/0010359 | A1* | 1/2011 | Burger | G06F 16/24542 |
| | | | | 707/718 |
| 2012/0173513 | A1* | 7/2012 | Agrawal | H05K 999/99 |
| | | | | 707/716 |
| 2012/0310921 | A1* | 12/2012 | Egan | G06F 16/284 |
| | | | | 707/718 |
| 2013/0318069 | A1* | 11/2013 | Alu | G06F 16/24542 |
| | | | | 707/718 |
| 2016/0306847 | A1* | 10/2016 | Ding | G06F 8/443 |
| 2017/0193047 | A1* | 7/2017 | Agrawal | H05K 999/99 |

OTHER PUBLICATIONS

"Query Store Usage Scenarios", https://msdn.microsoft.com/en-in/library/mt614796.aspx, Published on: Dec. 11, 2015, 25 pages.

Chevre, Sonja, "Fixing SQL Server Plan Cache Bloat with Parameterized Queries", https://www.dynatrace.com/blog/fixing-sql-server-plan-cache-bloat-parameterized-queries/, Published on: Jun. 22, 2016, 17 pages.

Li, et al., "Robust Estimation of Resource Consumption for SQL Queries using Statistical Techniques", In Proceedings of the Very Large Database Endowment, vol. 5, Issue 11, Aug. 27, 2012, pp. 1555-1566.

Berry, David, "Performance Implications of Parameterized Queries", https://www.simple-talk.com/sql/t-sql-programming/performance-implications-of-parameterized-queries/, Published on: Apr. 28, 2011, 14 pages.

* cited by examiner

INTELLIGENT QUERY PARAMETERIZATION OF DATABASE WORKLOADS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, databases and tables are now often distributed across various computer systems. Furthermore, cloud database systems often include hundreds of thousands, or even millions of databases, each of which may also include hundreds of thousands, or even millions, of distinct queries. Accordingly, managing and monitoring such enormous database systems may be extremely complex and difficult for a human database administrator. For instance, identifying particular queries (out of potentially millions of queries) of a database that would benefit from query parameterization may be very difficult. Such difficulties are compounded when millions of databases (e.g., within a cloud database system) are present. Additionally, previous workarounds for such difficulties (i.e. query parameterization) have often included numerous limitations, including but not limited to schema binding of underlying tables and insufficient or incomplete information from which to make educated determinations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to automatically determining whether query parameterization would be beneficial for one or more databases. For example, embodiments may include automatically gathering data associated with a workload of one or more databases. The workload of the one or more databases may be associated with a plurality of queries. Embodiments may further include automatically analyzing the data to determine, for each of one or more possible query parameterizations associated with the plurality of queries, whether the respective query parameterization would be beneficial.

The analysis may include at least an analysis of a total number of queries for each query template. Based on the analysis, including the total number of query templates, at least one of the one or more possible query parameterizations may be automatically selected to be recommended to a user of the one or more databases when the at least one query parameterization is determined to be beneficial. Embodiments may also include automatically generating a recommendation corresponding to one or more of the at least one query parameterization for presentation to the user.

In this way, query parameterization that would be beneficial to a database or set of databases may be automatically identified and recommended to a user (e.g., database administrator), which may be accepted or rejected by the user. Such recommendations may include an estimate of the performance gain that will be realized by implementing the recommend query parameterization. When query parameterization is implemented, verification that the implemented query parameterization did, in fact, benefit the database or set of databases, may automatically be performed.

As such, when query parameterization did not benefit the database(s), the database(s) may automatically be reverted to a previous state before the newly implemented query parameterization. On the other hand, when query parameterization did benefit the database(s), the implemented query parameterization may not be reverted. Additionally, the database(s) may be continually or periodically monitored to ensure that any currently implemented query parameterization continues to benefit the database(s) and/or to identify additional query parameterization that may benefit the database(s).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
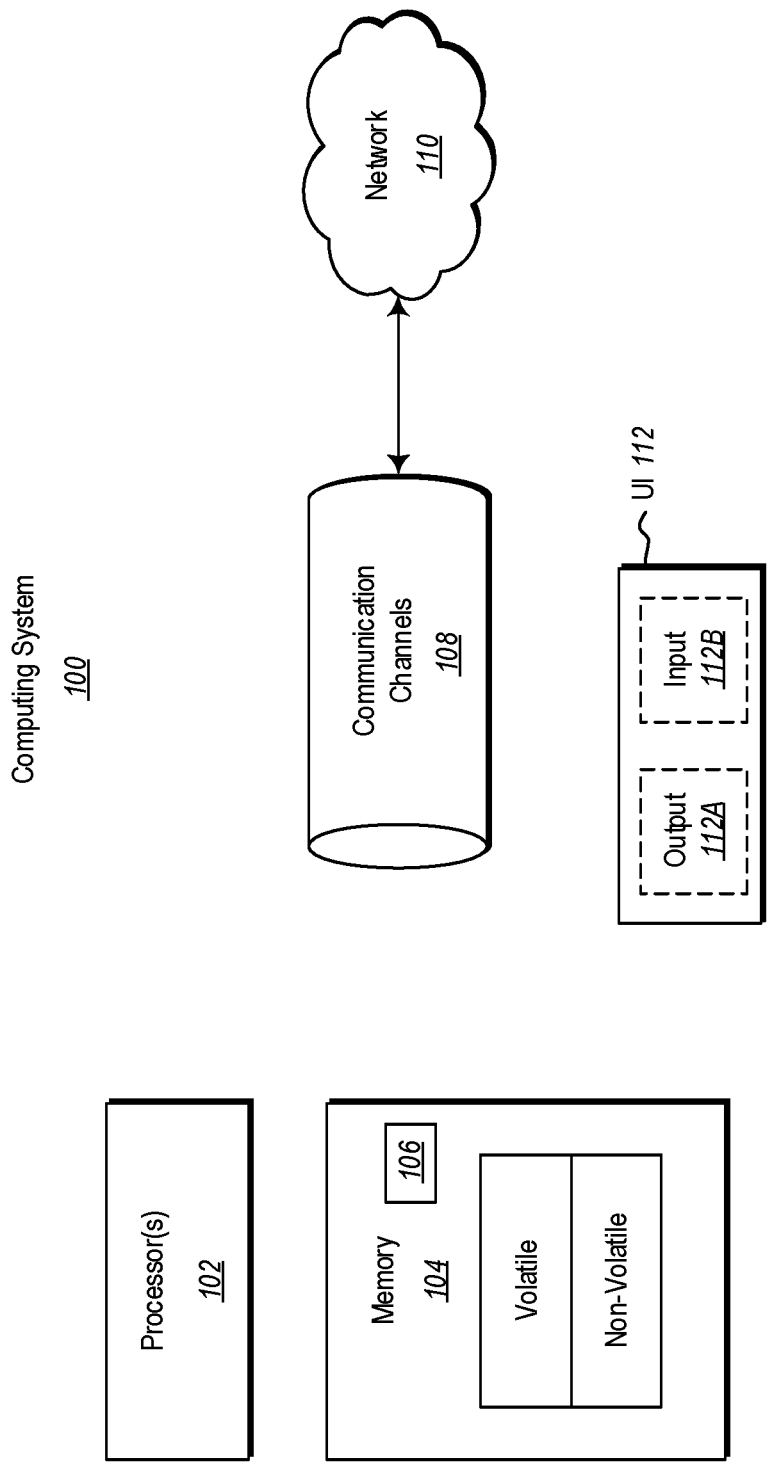
FIG. 1 illustrates an example computer architecture that facilitates operation of the principles described herein.

At least some embodiments described herein relate to automatically determining whether query parameterization would be beneficial for one or more databases. For example, embodiments may include automatically gathering data associated with a workload of one or more databases. The workload of the one or more databases may be associated with a plurality of queries. Embodiments may further include automatically analyzing the data to determine, for each of one or more possible query parameterizations associated with the plurality of queries, whether the respective query parameterization would be beneficial.

The analysis may include at least an analysis of a total number of query templates. Based on the analysis, including the total number of query templates, at least one of the one or more possible query parameterizations may be automatically selected to be recommended to a user of the one or more databases when the at least one query parameterization is determined to be beneficial. Embodiments may also include automatically generating a recommendation corresponding to one or more of the at least one query parameterization for presentation to the user.

In this way, query parameterization that would be beneficial to a database or set of databases may be automatically identified and recommended to a user (e.g., database administrator), which may be accepted or rejected by the user. Such recommendations may include an estimate of the performance gain that will be realized by implementing the recommend query parameterization. When query parameterization is implemented, verification that the implemented query parameterization did, in fact, benefit the database or set of databases, may automatically be performed.

As such, when query parameterization did not benefit the database(s), the database(s) may automatically be reverted to a previous state before the newly implemented query parameterization. On the other hand, when query parameterization did benefit the database(s), the implemented query parameterization may not be reverted. Additionally, the database(s) may be continually or periodically monitored to ensure that any currently implemented query parameterization continues to benefit the database(s) and/or to identify additional query parameterization that may benefit the database(s).

Some introductory discussion of a computing system will be described with respect to FIG. 1. Then automatically determine whether query parameterization would be beneficial for one or more databases will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
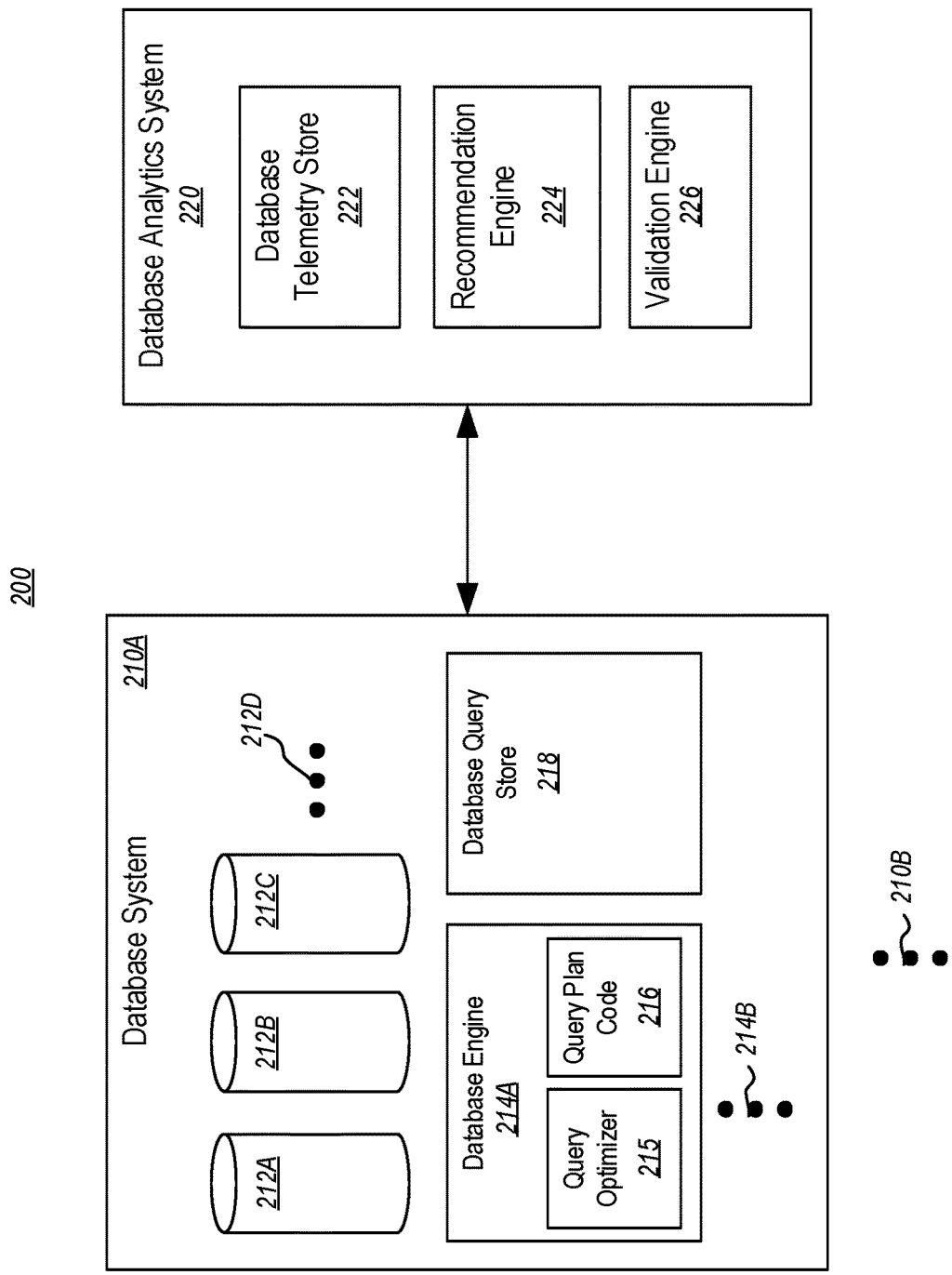
FIG. 2 illustrates an example environment for automatically determining when to recommend query parameterization.

FIG. 2 illustrates a computer environment 200 for automatically analyzing the workload of one or more databases to determine the impact of parameterizing one or more queries of the one or more databases, automatically recommending particular queries to be parameterized from the one or more queries, and automatically validating whether implemented parameterization had an expected impact. As shown, FIG. 2 includes a database computer system 210 and a database analytics computer system 220, which each may correspond to the computer system 100, as described with respect to FIG. 1. As illustrated, the database computer system 210 and the database analytics computer system 220 both include various engines and/or functional blocks that may be used to gather database data, analyze the gathered database data, generate recommendations, and verify that implemented recommendations perform as expected, as further described herein. The various engines and/or functional blocks of the database analytics computer system 220 may be implemented on a local computer system or may be implemented on a distributed computer system that includes elements resident in the cloud or that implement aspects of cloud computing.

The various engines and/or functional blocks of the database computer system 210 and the database analytics computer system 220 may be implemented as software, hardware, or a combination of software and hardware. Notably, both the database computer system 210 and the database analytics computer system 220 may include more or less than the engines/functional blocks illustrated in FIG. 2. Additionally, some of the engines/functional blocks may be combined as circumstances warrant. For instance, the database engine 214A and the database query store 218 may be combined into one functional block or more than two functional blocks. Although not illustrated, the various engine/functional blocks of the database analytics computer system 220 may access and/or utilize a processor and memory, such as processor 102 and memory 104, as needed to perform their various functions.

Notably, while only one database computer system 210A having any number of databases 212 is shown, ellipses 210 represents that the principles described herein may be practiced using essentially any number of database computer systems and/or databases. In particular, one of skill in the art will appreciate that one of the primary benefits of the principles described herein is the capability to practice these principles at essentially any scale of databases or database computer systems.

As illustrated in FIG. 2, the database computer system 210 includes three databases 212 (i.e., database 212A, database 212B, and database 212C are collectively referred to herein as databases 212). While only three databases 212 are illustrated as part of the database computer system 210, ellipses 212D represents that any number of databases may be included within the database computer system 210. For instance, in some embodiments, the number of databases 212 may comprise hundreds of thousands or even millions of databases.

In some embodiments, the databases 212 may comprise relational databases. In such embodiments, the relational databases may be managed using any number of query languages (e.g., SQL) and/or any number of database management systems (e.g., MICROSOFT SQL SERVER®, ORACLE®, MYSQL®, and so forth). In other embodiments, the databases 212 may comprise other types of databases, including, but not limited to, NoSQL databases, object databases, object-relational databases, and so forth. Furthermore, the databases 212 may be on-premise databases, cloud databases, or a combination of on-premise and cloud databases.

The database computer system 210 may further include a database engine 214A. The database engine 214A may comprise any appropriate combination of software and/or hardware that is capable of both receiving queries associated with the databases 212, as well as performing any applicable operations with respect to such queries and databases (e.g., building an appropriate response to a particular query). While only one database engine 214A is illustrated, ellipses 214B represents that any number of database engines may be utilized by the database computer system 210. For instance, each database 212 may include a separate database engine.

The database engine 214 may further identify and/or generate various data items corresponding to the databases 212. For instance, the database engine may identify computer resource usage associated with a database workload, compilation time associated with individual queries within the database workload, and so forth. A database workload, as discussed herein, may comprise all of the operations and processes performed with respect to a particular database or set of databases, as well as metadata and statistics associated with those operations and processes. For instance, data associated with a database workload may include the number of queries received, operations performed (e.g., aggregations performed with respect to data within a database/table, joining of tables within a database), the number of query text hashes, the number of query template hashes, the number of query plan hashes, resource usage, resource availability, and so forth (each of which is described in more detail herein).

The database engine 214 may also identify various data items or metadata corresponding to queries of a database (or set of databases). For instance, the database engine may identify the number of distinct queries received or associated with a particular database. The database engine may identify queries as being distinct when a query includes different parameters than other queries or even when a query has the same parameters as other queries, but distinct values associated with those parameters. Upon identifying different queries (whether based on the parameters included within a query alone or based on the values of included parameters), the database engine may generate a hash value associated with each unique query, referred to herein as a query text hash.

The database engine may further generate a query template hash for each identified query that includes different parameters. As such, each query that includes the same parameters will have the same query template hash, even when the values of the parameters are different. For example, two queries that each have parameters "x" and "y," will have the same query template regardless of whether the values for "x" and "y" are the same for each of the two queries.

Additionally, the database engine may generate a query plan hash for each execution plan that is created for each query (and/or each execution plan created for particular query templates), as described further herein. As shown, the database computer system 210 may include a query optimizer 215. Upon identifying each particular query (or particular query text hash), the query optimizer may analyze the particular query to determine an optimal execution plan for executing the particular query. The database engine may then generate a query plan hash for each execution plan generated by the query optimizer. Each generated query plan may then be stored in the query plan cache 216 of the database computer system 210. As such, query plans may be reused by the database engine to improve efficiencies associated with resource usage and compile time.

As shown, the database computer system 210 also includes a database query store 218 that gathers and stores the data corresponding to the databases 212 that is identified and/or generated by the database engine 214, as further described herein. For instance, the database query store may gather and store data related to resource consumption, resource capacity, query text hashes, query template hashes, and query plan hashes. This data may then be accessible to a user (e.g., a database administrator). In some embodiments, each particular database 212 may include a separate query store that gathers data corresponding to the particular database. In other embodiments, each particular database user (e.g., database administrator, end user, and so forth) may have a dedicated database query store that gathers information regarding workloads and data corresponding to the database(s) used by the particular user.

Previously, a database administrator may have used a query store similar to the one described herein, to maintain a database(s) in the best possible manner. For instance, a database administrator may have used such a query store to view query/database data (e.g., number of query text hashes, number of query plan hashes, resource usage, and so forth) in order to determine whether parameterizing particular queries of a database(s) (or parameterizing the entire database(s)) would be helpful to the database(s) (e.g., in terms of query compile time, resource usage, and so forth).

Such query parameterization (also referred to as a prepared statement) comprises a query that essentially includes placeholders for the parameters, such that only parameter values are supplied to a given parameterized query at execution time (i.e., a parameterized query is essentially pre-compiled and simply awaits to receive the particular values to be used for the parameters at the time of execution). In other words, any code associated with a query is first defined, and then data associated with each given parameter is later passed to the query. In this way, a database (or database engine) can easily determine the difference between the code associated with a query and the data (i.e. a parameter value) associated with the query. Furthermore, parameterization of queries can stop attackers from injecting malicious code in place of parameter values (e.g., data) to change the intent of a query, as an attacker cannot change the code of the query itself, but can only pass parameter values to the query.

Figure 3:
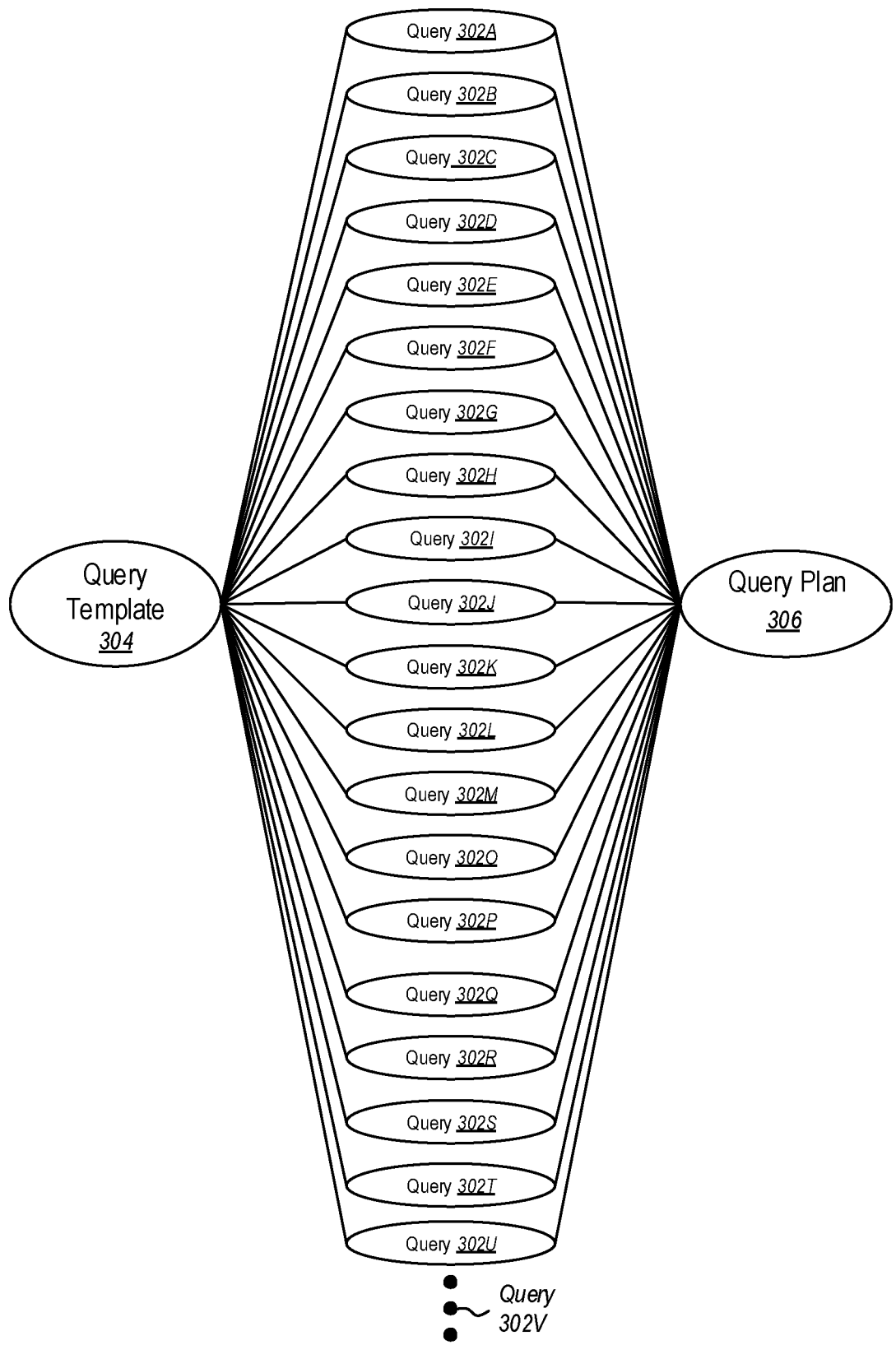
FIG. 3 illustrates an example of when query parameterization may be appropriate.

When query parameterization is performed with respect to queries of a database (or databases), the database engine can generally reuse the same execution plan for all queries that have the same query template (i.e., all queries that have the same parameters, regardless of the values of those parameters). For instance, FIG. 3 illustrates an example of when query parameterization is entirely beneficial. As illustrated, FIG. 3 includes 20 queries 302 (i.e., query 302A through query 302T) that each map to a single query template 304 and a single query plan 306. While only 20 queries 302 are illustrated, ellipses 302U illustrates that any number of queries may be used to practice the principles described herein.

As can be assumed from FIG. 3, each query 302 includes the same parameters, which is why all 20 queries 302 have resulted in one generated query template. However, each of the 20 queries 302 may have different parameter values, which can sometimes result in different generated query execution plans. As illustrated, however, each of the 20 queries 302 resulted in the same, single query execution plan 306. As such, the execution plan 306 may be cached after generation of the first query 302 (e.g., query 302A) and then may be reused for each of the other 19 queries 302 (i.e., query 302B through query 302T). Such cases that result in a similar number of generated query plans to generated query templates (i.e., reasonably close to a 1:1 ratio) are great candidates for query parameterization, provided that the number of queries that correspond to the query template (or to each query template) is relatively high, as further described herein.

Such reuse of execution plans can have numerous benefits, including but not limited to reducing the total query execution time by removing at least some steps of compilation and optimization, improving the query plan cache effectiveness by having to store fewer plans in the query plan cache and increasing cache hit chance, shortening failover and cold start time (i.e., in cases when a currently in-use database fails and redundant databases are available) by having to compile fewer queries while the query plan cache of a redundant database to be used is empty, improving the effectiveness of workload metadata and runtime statistics collection by allowing the query store to better track database workloads, as less storage is used, enabling easier query optimization, as any optimization logic may be applied to all queries that have the same query template (whereas previously, each query having a different query text has was treated as a separate query), and improving the amount of computer resources used.

While there can be great benefits, making such determinations of whether to parameterize some or all queries of a database can be very complex. For instance, parameterizing queries can have different effects on database performance, depending on the type of workload and the shape of the queries (i.e., the parameters and parameter values included within a particular query) that are being processed. As previously described, in some instances, a database can realize great benefits from query parameterization, including but not limited to significantly reducing the overall query compilation time, lowering the amount of resources spent, and removing the pressure on an execution plan cache generated by the number of plans generated from non-parameterized queries, as described further herein.

However, in other instances, parameterization can cause problems relating to unpredictable performance of parameter sensitive plans (PSP), where the same query execution plan could have significantly different performance when executed with respect to two different queries that each have the same query template hash (i.e., both queries include the same parameters), but different query text hashes (i.e., the values of the included parameters are different for each of the two queries). Such unpredictable performance may include high levels of resource usage, for example, in circumstances where a user is expecting improved performance based at least partially on query parameterization.

Figure 4:
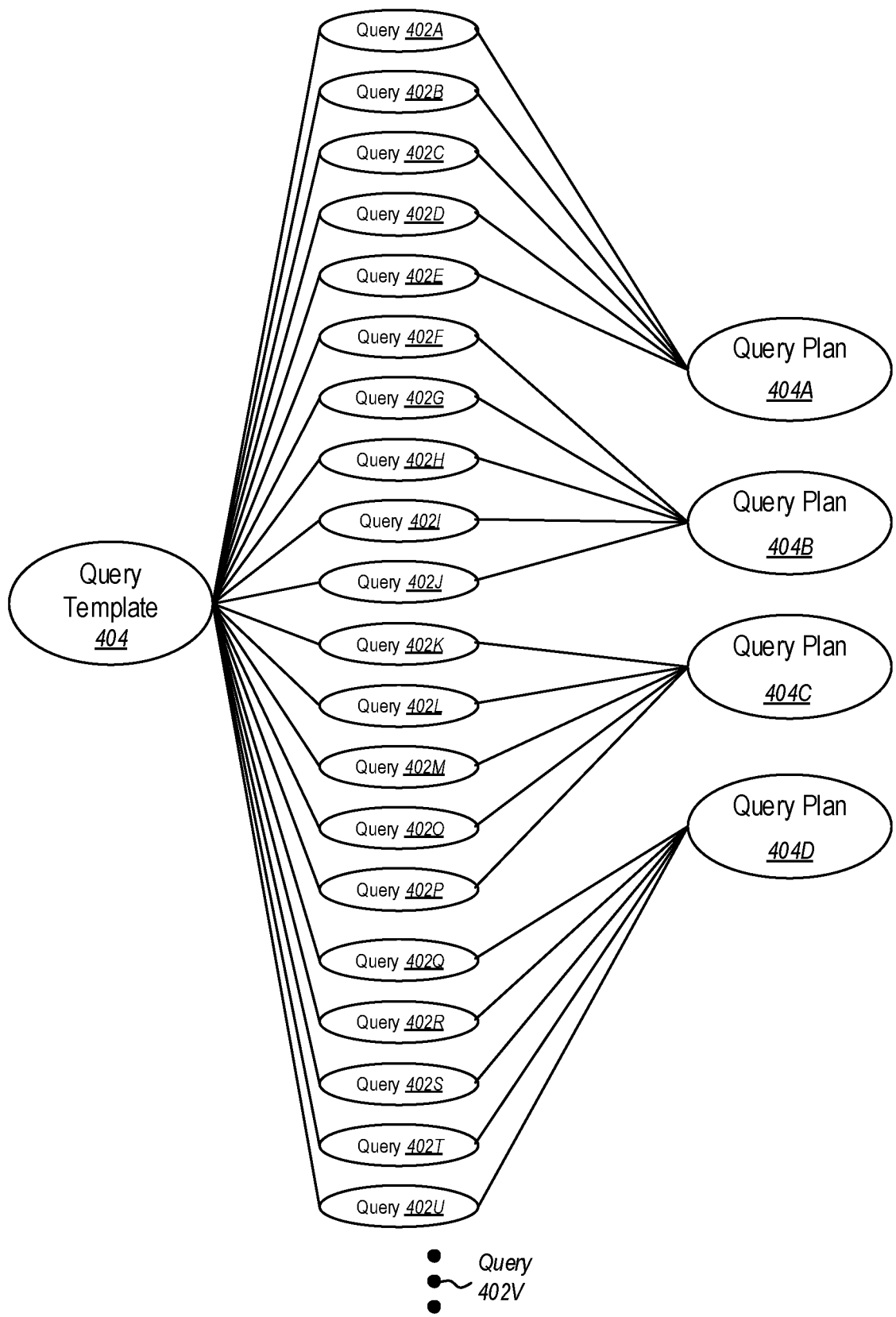
FIG. 4 illustrates an example of when query parameterization may not be appropriate.

FIG. 4 illustrates the occurrence of PSP. As shown, FIG. 4 includes 20 queries 402 (i.e., query 402A through query 402T) that each map to a single query template 404. While only 20 queries 402 are illustrated, ellipses 402U illustrates that any number of queries may be used to practice the principles described herein. As can be assumed from FIG. 4, each query 402 includes the same parameters, which is why all 20 queries 402 have resulted in one generated query template 404. However, each of the 20 queries 402 may have different parameter values, which can sometimes result in different generated query execution plans. As illustrated, the 20 queries 402 resulted in the generation of four query execution plans 404 (i.e., query execution plan 404A through query execution plan 404D). While only four query execution plans 404 are illustrated, ellipses 404E represents that any number query execution plans may be generated, limited only by the number of queries 402.

Accordingly, if parameterization were used with respect to the 20 queries 402, PSP would occur, despite all 20 queries resulting in the same query template 404. As such, using the same query execution plan for each of the 20 queries 402 would likely result in the problems associated with PSP discussed herein (e.g., unpredictable performance regarding resource usage, query compile times, and so forth) based on the fact that the optimal query execution plan would only be used with respect to five of the 20 queries. Accordingly, query parameterization would not likely be recommended in such instances, as described further herein. While this example includes relatively few queries, when millions of queries or more are involved, the performance problems associated with PSP can be significant. PSP can also be very difficult to identify because PSP occurs in situations when numerous query text hashes result in the same query template hash, and would therefore, generally be likely to result in the same query execution plan. These difficulties are also compounded when attempting to determine which particular queries (out of potentially millions of queries or more) are causing PSP problems, especially in the case of a human database administrator.

While determining whether a database, multiple databases, or particular queries within a database would benefit from query parameterization is a complex task, it is similarly difficult for a database administrator to further determine exactly how much benefit would be realized from query parameterization. These complexities of a human database administrator are exacerbated by query stores that have often been incapable of providing all relevant data to the database administrator. For instance, databases that would benefit from query parameterization may have millions of different query text hashes that result in close to the same number of query plans generated (despite many of those generated queries resulting in the same query plan hashes). As such, it can be impossible for the query plan cache to store all of the query plans (and/or to realize any benefit from the ability to reuse query plans), and can therefore be essentially impossible for the database query store to store all of the generated query plans, as query stores generally have limited disk space.

In such cases, the query store can run out of disk space, enter a read-only mode, and fail to continue capturing relevant data (e.g. query texts, query plans, and so forth) regarding the database(s). Accordingly, a database administrator may not even have access to all of the relevant data to make query parameterization determinations. Additionally, template hashes, as described herein, have not been available to database administrators previously. Query template hashes can be crucial in identifying when query parameterization would be beneficial for an entire database or with respect to individual queries of a database, as further described herein. Similarly, query template hashes can be crucial to determining when PSP issues are likely to occur, as further described herein. More specifically, without using query template hashes in relation to query text hashes and query plan hashes (i.e., the ratio of query template hashes to each of query text hashes and query plan hashes), it may be very difficult to accurately determine when PSP issues are likely to occur and when query parameterization may be most beneficial.

Furthermore, using a human database administrator is impractical to perform such analyses for hundreds of thousands or even millions of databases. As such, human database administrators do not offer scalability or the ability to monitor cloud database environments that include enormous numbers of databases. Additionally, when a database workload includes hundreds of thousands, or millions, of queries, a human database administrator may have great difficulty in determining particular queries that are having PSP issues (or even identifying which particular queries would benefit from query parameterization). In conjunction with these issues, more complexity is also added with respect to determining whether implemented query parameterization actually resulted in expected improvements to a given database(s), as such determinations include gathering and analyzing large amounts of data.

Finally, even when query parameterization determinations are made by human database administrators, the parameterization and underlying databases can be restrained by plan guides. Plan guides are used by human database administrators that would like to perform parameterization with respect to queries of a database or set of databases that the database administrator monitors. Plan guides may require a database administrator to change the application logic of the database in order to implement any query parameterization. Such changing of application logic through plan guides also includes schema binding. As such, once a database administrator implements query parameterization through plan guides, the database (or the underlying data structures, such as tables) cannot be modified (e.g., adding/deleting rows, adding/deleting columns, and so forth) while the implemented parameterization is in place. Accordingly, previous solutions to query parameterization include numerous limitations (e.g., schema binding, scalability, and so forth) and complexities (e.g., changing application logic of the database(s), determining when query parameterization is appropriate without complete data corresponding to a database, and so forth) that are ameliorated through the principles described herein.

The principles described herein include automatically identifying databases or queries within databases that would benefit from applying query parameterization, automatically recommending such parameterization, automatically quantifying the estimated performance gain of such change, automatically verifying that the quantified estimated performance gain was actually achieved, and automatically performing continuous monitoring of database performance to detect any problems with PSP's. Such information can then be displayed to users (e.g., database administrators), allowing them to easily apply automatic query parameterization for their databases without making any changes to their queries in the database application logic.

If any negative effects of parameterization are detected, the offending changes may be automatically reverted. In this way, users can fully delegate the management of query parameterization, without having to worry about determining which queries to parameterize, changing database application logic, or the performance impact any such decisions may have (e.g., caused by PSP issues). Additionally, the principles described herein may be used with respect to both on-premise and cloud databases, and may be particularly beneficial with respect to databases having intensive workloads (e.g., a high volume of queries).

In particular, as briefly mentioned, FIG. 2 also includes the database analytics system 220. The database analytics system 220 comprises a computer system for determining whether one or more recommendations should be generated for a user of the database system 210, generating such recommendations when applicable, and verifying that such recommendations perform as intended when implemented by a user. As illustrated, the database analytics system includes database telemetry store 222. The database telemetry store 222 gathers and stores data from the database system 210 that may be similar to the data identified, gathered, and stored by the database query store. Furthermore, the database telemetry store 222 may comprise the computer system 100 as described in FIG. 1, and may therefore be a distributed or local computer system. Additionally, the database telemetry store 222 may also comprise any appropriate combination of hardware and/or software.

For instance, the database telemetry store may gather and store data including but not limited to computer resource usage associated with workloads (e.g., of a database computer system, of a database, or of particular queries within a database/database system), compilation/execution time associated with workloads (e.g., particular compilation/execution times associated with particular queries, average compilation/execution times of all queries of a database(s), average compilation/execution times of particular queries, and so forth), query text hashes (including the total number of different query text hashes), query template hashes (including the total number of different query template hashes), query plan hashes (including the total number of query plan hashes), and so forth.

Notably, the database telemetry store may gather database data from the database system 210, as well as other databases/database systems. Using data from other databases that are external to the database computer system 210 in this manner may also help in more intelligently analyzing the workload of the database computer system 210 (e.g., using heuristics based at least partially on prior experiences with workloads of databases and/or queries similar to that of the database computer system 210). Furthermore, the database telemetry store may have access to large amounts of storage, such that all relevant data corresponding to a particular database or set of databases is stored in the database telemetry store (and accessible for further analysis).

As shown, the database analytics computer system 220 also includes a recommendation engine 224. The recommendation engine 224 may comprise the computer system 100 as described in FIG. 1, and may therefore be a distributed or local computer system. Additionally, the recommendation engine may also comprise any appropriate combination of hardware and/or software. The recommendation engine may first access data that has been gathered and stored by the database telemetry store 222. Alternatively, in some embodiments, the recommendation engine may access data directly from the database query store 218.

Regardless of the way in which database workload data is accessed, the recommendation engine 224 may then perform analyses on all available data (e.g., provided by the database telemetry store 224) to determine which particular queries within a database, or which particular databases (e.g., potentially all queries associated with a database) would benefit from query parameterization. Accordingly, the recommendation engine may not only determine which queries would benefit most, but also which databases (e.g., within a cloud database system of millions or more databases) would benefit the most from parameterization of queries. More particularly, when analyzing data associated with the workload of a particular database, set of databases, and so forth, the recommendation engine may consider any combination of resource capacity data (i.e., the available resources of the particular database(s)), resource consumption data (i.e., the amount of computer resources used), query text hashes, query template hashes, and query template plans to determine whether parameterization of queries would be beneficial.

Accordingly, beneficial, with respect to this disclosure, means that a database or set of databases may see improvements in operations of the database(s). For instance, the recommendation engine may determine that parameterization of queries would be beneficial for a database(s) when the recommendation has performed analyses on corresponding database workload data that results in expected improvements in the computer resource consumption (i.e., query parameterization will result in less resources consumed, required available resources (i.e., less computer resources needed to provide sufficient processing power of a database workload), overall query compile/execution time associated with the workload of a database(s), average query compile/execution time, and so forth.

With respect to resource capacity data, the recommendation engine may be able to analyze what resources are available to a particular database or set of databases and consider the available amount of resources in any determination as to whether parameterization of queries would be beneficial (e.g., less resources consumed in this context) for the database(s), and further whether to make a recommendation. Accordingly, in this description, analyses by the recommendation engine (or validation engine) to make a parameterization recommendation may also be synonymous with analyses by the recommendation engine (or validation engine) to determine whether parameterization of queries would benefit the database(s).

The recommendation engine may further consider the amount of resources that are being used by the particular database or set of databases, especially in relation to the amount of resources that are available, when determining whether parameterization of queries would be beneficial to the database(s), and further whether to make a recommendation. As such, any analysis that includes expected improvement in the amount of resources used, in the efficiency of resources used (e.g., perhaps allowing a user to dedicate less resources to a database or set of databases), in the average compile/execution time of a particular query, in the overall average compile/execution time of all queries, and so forth, may make it more likely that a recommendation to parameterize is made by the recommendation engine.

The recommendation engine may also determine and consider a ratio of the total number of distinct query text hashes to the total number distinct query template hashes with respect to making a determination as to whether parameterization of queries would be beneficial and/or as to whether a parameterization recommendation will be made. By comparing the total number of distinct query text hashes generated by a database engine to the number of distinct query templates generated, the recommendation engine can determine how many queries were unnecessarily considered as unique queries, resulting in newly generated and compiled execution plans for each distinct query text hash.

Notably, such a conclusion assumes that each query text hash that results in the same query template hash would have the same execution plan (or query plan hash), which is not always a correct assumption, as further described herein (i.e., assuming that no PSP's exist). The ratio of distinct queries to distinct templates may be monitored over a certain time period with respect to a particular database (e.g., over a day, over a week, over a month, and so forth).

The recommendation engine 224 may also compare data accessed from the database telemetry store 222 with data accessed from the database query store 218, to ensure that the same patterns exist in both locations. If the ratio between the number of distinct query text hashes and distinct query template hashes is high (i.e., a lot of distinct query text hashes when compared to the number of distinct query template hashes), and assuming no PSP's are present, then most of the queries are very likely using a small number of query execution plans. As such, in cases having a relatively high number of query text hashes and a relatively low number of corresponding query template hashes, the database generally has potential to benefit from query parameterization.

In some embodiments, a threshold may be used to determine which ratios are high enough to benefit a database(s), and further high enough to consider making a determination that a query parameterization recommendation is to be made. For instance, the threshold may be at least 100 query texts to one query template, 1,000 query texts to one query template, 10,000 query texts to one query template, or 100,000 query texts to one query template. Notably, while particular ratio thresholds are enumerated herein, the particular ratio thresholds are only for exemplary purposes, as essentially any threshold value may be used to practice the principles described herein. This logic of ratios may be applied to the overall ratio of an entire database (or set of databases), as well as to individual query templates. In this way, the recommendation engine may consider both general scenarios (i.e., parameterizing an entire workload of a database or set of databases) and more specific scenarios (i.e., parameterizing particular queries within a database or set of databases) when determining whether a database(s) may benefit and/or whether to make a parameterization recommendation.

In an example, assume that no PSP's are present and that 3,000 different query texts have been identified, while only 3 different query templates have been identified. Also, assume that the threshold to potentially recommend query parameterization is at least 1,000 different query texts for each different query template. Viewing the database workload as a whole, the threshold is met. As such, query parameterization may be determined to be beneficial for the entirety of the database workload, and may therefore be recommended for the entirety of the database workload.

In a slightly more specific example, make all of the same assumptions with an additional assumption that a determination was made that the first of the three query templates includes a ratio of 2,300 distinct query texts to the first query template (i.e., a 2,300:1 ratio), the second of the three query templates includes a ratio of 600 distinct query texts to the second query template (i.e., a 600:1 ratio), and the third of the three query templates includes a ratio of 100 distinct query texts to the third query template (i.e., a 100:1 ratio). Accordingly, when viewing the database at the level of each particular query template, the only potential recommendation to be made is for parameterizing the queries corresponding to the first template, as the ratio of at least 1,000:1 is met. As such, no recommendation to parameterize the queries corresponding to the second and third query templates may be made, and little or no benefit is likely to be found.

The recommendation engine may further identify and consider the ratio of the number of distinct query plan hashes to the number of distinct query template hashes with respect to determining whether parameterization of queries would benefit a database(s) and/or whether a query parameterization recommendation is to be made. When the ratio of distinct query plan hashes to the number of distinct query template hashes is high, there are likely many queries that have the same query template, but have different execution plans (i.e., PSP's are likely occurring). Accordingly, in such situations, the recommendation engine may determine that no benefit is likely to be realized by the database(s), and therefore, refrain from recommending query parameterization for the database(s) based on determining that those databases are more likely to have PSP problems when queries are parameterized.

In an example, assume that there are 10,000 unparameterized queries that all result in one query template hash (i.e., there are 10,000 queries that all result in one query template, or 10,000 query text hashes and 1 query template hash). Also, assume that the query optimizer has analyzed all 10,000 queries and each query has resulted in the same query plan hash. Accordingly, these 10,000 queries result in a single query plan hash and a single query template hash, or a 1:1 ratio of the number of query plan hashes to the number of query template hashes. As such, query parameterization would be highly likely to benefit a database(s) in such cases and would likely be recommended with respect to those 10,000 queries (assuming the other factors considered are also favorable—resource capability/availability, resource consumption, and so forth).

In a second example, assume that there are 10,000 unparameterized queries that all result in one query template hash (i.e., there are 10,000 queries that all result in one query template, or 10,000 query text hashes and 1 query template hash). Also, assume that the query optimizer has analyzed all 10,000 queries and the 10,000 queries result in 100 different query plan hashes, despite also resulting in one query template hash. Accordingly, these 10,000 queries result in 100 query plan hashes and a single query template hash, or a 100:1 ratio of the number of query plan hashes to the number of query template hashes. As such, query parameterization would be highly likely to fail (i.e., highly likely to not be beneficial, and perhaps likely detrimental) in such cases and would likely not be recommended with respect to those 10,000 queries.

Accordingly, the recommendation engine may consider all of the applicable data included within the database telemetry store (or potentially the database query store) associated with a particular database or set of databases to determine whether a database(s) would benefit from parameterization of queries and/or whether to make a parameterization recommendation. For instance, as described further herein, the recommendation engine may consider any combination resource capacity data, resource consumption data, the overall ratio of query text hashes to query template hashes, the ratio of query text hashes to each query template hash, and the ratio of query plan hashes to query template hashes with respect to a particular database or set of databases in order to determine whether a database(s) would benefit and/or a recommendation is to be made. Along with determining whether to make a recommendation and actually making the recommendation, the recommendation engine may also execute the actual parameterization, such that parameterization corresponding to the recommendation also occurs.

Once the recommendation engine has determined that a recommendation should be made, the recommendation can then be pushed to users (e.g., database administrators) in any applicable way. For instance, a user interface (e.g., through a menu, a pop-up, a modal dialog, and so forth) may be presented to a user that specifies the parameterization recommendation(s). Such a user interface may also include one or more selectable user interface controls that allow the user to determine whether or not implement the recommendation. Notably, in some embodiments, a user may be able to request that an analysis of the user's database(s) be performed and that any applicable parameterization recommendations be made. A user may also be allowed to have the database analytics system 220 determine when parameterization should be implemented without any additional input from the user. In such embodiments, the database analytics system may implement parameterization in each situation in which the recommendation engine would have recommended parameterization to the user.

In some embodiments, recommendations may include an expected benefit or improvement from implementing the recommendation. For instance, such an expected improvement may be in the form of expected resource usage improvements, necessary resource availability improvements (i.e., the improvements may allow the user to consume less resources or even require less available resources with which to process a workload associated with the database(s)), average query compilation/execution time, and so forth. Parameterization recommendations may also include a confidence level associated with the likelihood that parameterization will benefit a given database or set of databases. In an example, the confidence levels may comprise a very high confidence level, high confidence level, medium confidence level, low confidence level, and very low confidence level that a given parameterization recommendation will benefit the given database or set of databases.

Alternatively, the recommendation engine may refrain from making recommendations unless an analysis for a given database or set of databases results in a determination that meets a particular threshold. For instance, unless an analysis results in a determination that parameterization is highly likely to succeed (e.g., at least 95% chance to succeed), the recommendation engine may refrain from making a recommendation. In other embodiments, the recommendation engine may make such recommendation determinations based on a risk factor associated with the current state of the workload of a database (or set of databases). The risk factor may then be compared against a threshold to determine whether one or more query parameterization recommendations are to be made.

Notably, the recommendation engine may make numerous separate recommendations at the same time. For instance, the recommendation engine may make a first query parameterization recommendation with respect to a first particular group of queries and a second query parameterization recommendation with respect to a second particular group of queries. While the previous example discusses only two separate recommendations, any number of recommendations may be made at once. In such circumstances, each particular recommendation may include a separate expected improvement, confidence level, risk factor, and so forth, associated with the particular recommendation.

As illustrated in FIG. 2, the database analytics system also includes a validation engine 226. The validation engine 226 may comprise the computer system 100 as described in FIG. 1, and may therefore be a distributed or local computer system. Additionally, the validation engine may also comprise any appropriate combination of hardware and/or software. Once a recommendation has been implemented, the validation engine 226 (and/or recommendation engine) may periodically analyze data included in the database telemetry store for any given database or set of databases to determine if new recommendations should be made or if databases that have had queries parameterized should potentially be reverted to prior states (i.e., states that have either different parameterization or no parameterization). In particular, the validation engine 226 may verify that an expected impact for each implemented parameterization recommendation was actually realized.

The validation engine may ensure that at least some improvement (e.g., in query compile/execution time, resource usage, and so forth) was realized. However, if no improvements actually occurred, or if performance is actually worse, the validation engine may revert the implemented parameterization to a previous state of the database or set of databases. Accordingly, the database telemetry store 222 may continually gather database data, such that continuous parameterization analysis and validation (i.e., in cases where parameterization has already been implemented) can occur.

Figure 5:
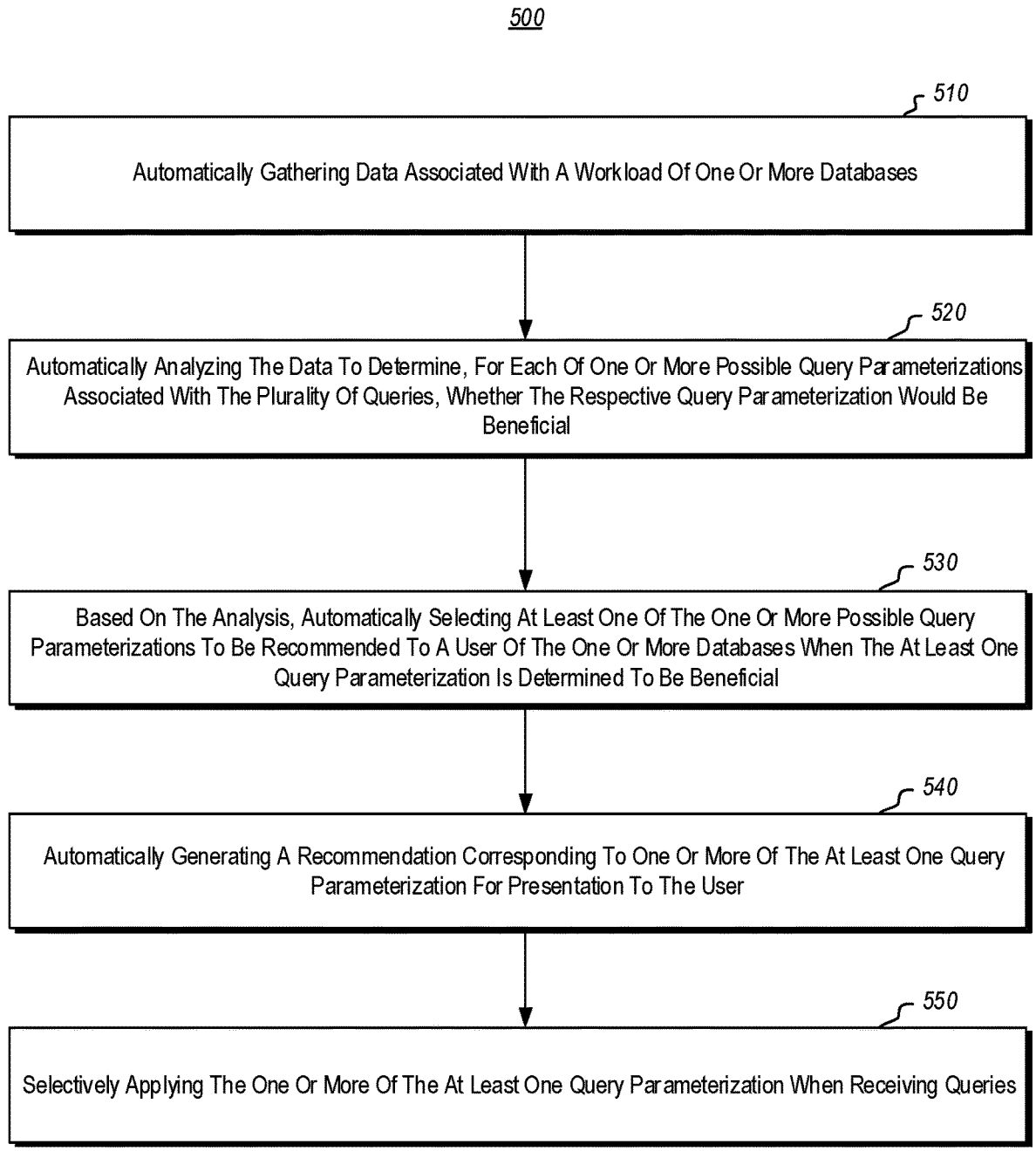
FIG. 5 illustrates a flowchart of a method for automatically determining when to recommend query parameterization.

FIG. 5 illustrates a flowchart of a method 500 for automatically determining whether query parameterization would be beneficial for one or more databases. The method 400 is described with frequent reference to the environment 200 of FIG. 2. The method 200 includes automatically gathering data associated with a workload of one or more databases (Act 510). For instance, the database telemetry store may gather workload data associated with one or more databases. The workload is associated with a plurality of queries corresponding to the one or more databases. Furthermore, with regard to one or more particular databases, such workload data may include average compilation/execution time of queries, resource capacity, number of query text hashes, number of query template hashes, and number of query plan hashes.

The method further includes automatically analyzing the data to determine, for each of one or more possible query parameterizations associated with the plurality of queries, whether the respective query parameterization would be beneficial (Act 520). For instance, the recommendation engine 224 may be capable of using the workload data described to determine when a database or set of databases would benefit from some form of query parameterization (e.g., with respect to all queries of a database or with respect to particular queries of a database). In a more particular example, the recommendation engine may consider some combination of resource usage, resource capacity, average compile/execution time of a particular query, and/or particular compile/execution times of queries overall, as well as ratios of query text hashes, query template hashes, and query plan hashes, to determine whether any form of query parameterization would be beneficial to a database (or set of databases). The recommendation engine may further consider similar combinations to determine when a risk of PSP issues is present.

The method also includes, based on the analysis, automatically selecting at least one of the one or more possible query parameterizations to be recommended to a user of the one or more databases when the at least one query parameterization is determined to be beneficial (Act 530). For example, the recommendation engine may select one or more query parameterization recommendations to be presented to a user of the one or more databases based on the analysis of database workload data.

The method also includes automatically generating a recommendation corresponding to one or more of the at least one query parameterization for presentation to the user (Act 540). For example, the recommendation engine may generate recommendations to be presented to a user based on the selected query parameterizations. A user may then be able to select which recommendations the user would like to implement. The method 500 may further include selectively applying the one or more of the at least one query parameterizations when receiving one or more queries (Act 550). Once query parameterizations have been implemented, the validation engine 226 may then determine whether expected performance improvements were actually realized by the database or set of databases. When expected performance improvements have not been realized, the validation engine may automatically revert the database to a previous state in relation to query parameterization (i.e., the newly implemented query parameterization may be reverted).

In this way, query parameterization that would be beneficial to a database or set of databases may be automatically identified and recommended to a user (e.g., database administrator), which may be accepted or rejected by the user. Such recommendations may include an estimate of the performance gain that will be realized by implementing the recommend query parameterization. When query parameterization is implemented, verification that the implemented query parameterization did, in fact, benefit the database or set of databases, may automatically be performed.

As such, when query parameterization did not benefit the database(s), the database(s) may automatically be reverted to a previous state before the newly implemented query parameterization. On the other hand, when query parameterization did benefit the database(s), the implemented query parameterization may not be reverted. Additionally, the database(s) may be continually or periodically monitored to ensure that any currently implemented query parameterization continues to benefit the database(s) and/or to identify additional query parameterization that may benefit the database(s).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
    one or more processor(s); and
    one or more computer-readable hardware storage device(s) having stored thereon computer-executable instructions that are executable by the one or more processor(s) to cause the computer system to automatically determine whether query parameterization would be beneficial for one or more database(s) by causing the computer system to at least:
        automatically gather data associated with a workload of one or more database(s), the workload being associated with a plurality of queries;
        automatically analyze the data to determine, for each of one or more identified query parameterization(s) that are identified as being associated with the plurality of queries, whether the respective query parameterization would be beneficial, wherein analyzing the data includes at least an analysis of a total number of query templates;
        based on the analysis, including the total number of query templates, automatically select at least one of the one or more identified query parameterization(s) to be recommended to a user of the one or more database(s) when the at least one query parameterization is determined to be beneficial;
        automatically generate a recommendation corresponding to one or more of the at least one query parameterization for presentation to the user; and
        selectively apply the one or more of the at least one query parameterization when receiving one or more queries.

2. The computer system in accordance with claim 1, wherein the generated recommendation includes an expected improvement in the one or more database(s) associated with implementing the at least one query parameterization.

3. The computer system in accordance with claim 2, wherein the expected improvement in the one or more database(s) comprises an expected improvement in at least one of: (i) computer resource usage or (ii) overall query compile time.

4. The computer system in accordance with claim 2, wherein execution of the computer-executable instructions further causes the computer system to perform the following in response to receiving user input associated with implementing the generated recommendation:
    automatically implement the generated recommendation without performing schema binding associated with any of the one or more database(s); and
    automatically verify that the expected improvement from implementing the generated recommendation was realized in the one or more database(s).

5. The computer system in accordance with claim 4, wherein execution of the computer-executable instructions further causes the computer system to perform the following in response to receiving the user input associated with implementing the generated recommendation:
    automatically revert to a previous state of the one or more database(s) when the expected improvement is not realized.

6. The computer system in accordance with claim 4, wherein implementing the generated recommendation comprises performing query parameterization with respect to each query of at least one database of the one or more database(s).

7. The computer system in accordance with claim 1, wherein the workload of the one or more database(s) comprises at least one of total number of distinct queries, total number of query templates, or total number of query execution plans.

8. The computer system in accordance with claim 1, wherein automatically analyzing the data comprises analyzing a combination of a resource usage, a resource availability, a total number of distinct queries, a total number of query templates, and a total number of query execution plans of the one or more database(s).

9. The computer system in accordance with claim 8, wherein automatically analyzing the data further comprises analyzing a ratio of the total number of distinct queries to the total number of query templates.

10. A method, implemented at a computer system that includes one or more processor(s), for automatically determining whether query parameterization is beneficial for one or more database(s), comprising:
    automatically gathering data associated with a workload of one or more database(s), the workload being associated with a plurality of queries;
    automatically analyzing the data to determine, for each of one or more identified query parameterization(s) that are identified as being associated with the plurality of queries, whether the respective query parameterization would be beneficial, wherein analyzing the data includes at least an analysis of a total number of query templates;
    based on the analysis, including the total number of query templates, automatically selecting at least one of the one or more possible identified query parameterization(s) to be recommended to a user of the one or more database(s) when the at least one query parameterization is determined to be beneficial;
    automatically generating a recommendation corresponding to one or more of the at least one query parameterization for presentation to the user; and
    selectively apply the one or more of the at least one query parameterization when receiving one or more queries.

11. The method in accordance with claim 10, wherein the generated recommendation includes an expected improvement in the one or more database(s) associated with implementing the at least one query parameterization.

12. The method in accordance with claim 11, wherein the expected improvement in the one or more database(s) comprises an expected improvement in at least one of: (i) computer resource usage or (ii) overall query compile time.

13. The method in accordance with claim 11, further comprising performing the following in response to receiving user input associated with implementing the generated recommendation:
   automatically implementing the generated recommendation without performing schema binding associated with any of the one or more database(s); and
   automatically verifying that the expected improvement from implementing the generated recommendation was realized in the one or more database(s).

14. The method in accordance with claim 13, further comprising performing the following in response to receiving the user input associated with implementing the generated recommendation:
   automatically revert to a previous state of the one or more database(s) when the expected improvement is not realized.

15. The method in accordance with claim 13, wherein implementing the generated recommendation comprises performing query parameterization with respect to each query of at least one database of the one or more database(s).

16. One or more computer-readable hardware storage device(s) having stored thereon computer-executable instructions that are executable by one or more processor(s) of a computer system to cause the computer system to automatically determine whether query parameterization would be beneficial for one or more database(s) by causing the computer system to at least:
   automatically gather data associated with a workload of one or more database(s), the workload being associated with a plurality of queries;
   automatically analyze the data to determine, for each of one or more identified query parameterization(s) that are identified as being associated with the plurality of queries, whether the respective query parameterization would be beneficial, wherein analyzing the data includes at least an analysis of a total number of query templates;
   based on the analysis, including the total number of query templates, automatically select at least one of the one or more identified query parameterization(s) to be recommended to a user of the one or more database(s) when the at least one query parameterization is determined to be beneficial;
   automatically generated a recommendation corresponding to one or more of the at least one query parameterization for presentation to the user; and
   selectively apply the one or more of the at least one query parameterization when receiving one or more queries.

17. The one or more computer-readable hardware storage device(s) of claim 16, wherein the workload of the one or more database(s) comprises at least one of total number of distinct queries, total number of query templates, and total number of query execution plans.

18. The one or more computer-readable hardware storage device(s) of claim 16, wherein automatically analyzing the data comprises analyzing a combination of a resource usage, a resource availability, a total number of distinct queries, a total number of query templates, and a total number of query execution plans of the one or more databases.

19. The one or more computer-readable hardware storage device(s) of claim 18, wherein automatically analyzing the data further comprises analyzing a ratio of the total number of distinct queries to the total number of query templates.

20. The one or more computer-readable hardware storage device(s) of claim 16, wherein automatically analyzing the data further comprises analyzing a ratio of the total number of query execution plans to the total number of query templates.

* * * * *